(12) United States Patent
Kwon

(10) Patent No.: US 8,361,233 B2
(45) Date of Patent: Jan. 29, 2013

(54) GLASS SUPPORT SYSTEM, METHOD OF SUPPORTING GLASS, AND ETCHING EQUIPMENT USING THE SAME

(75) Inventor: Hyuk Min Kwon, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/159,804

(22) Filed: Jun. 23, 2005

(65) Prior Publication Data

US 2005/0284577 A1    Dec. 29, 2005

(30) Foreign Application Priority Data

Jun. 28, 2004 (KR) .................. 10-2004-0048802

(51) Int. Cl.
*C23F 1/00* (2006.01)
*B44C 1/22* (2006.01)

(52) U.S. Cl. .................. 118/728; 118/500; 414/416.01; 206/832; 216/80; 156/345.51; 65/182.2; 65/25.2

(58) Field of Classification Search .......... 65/182.1, 65/182.2, 351, 25.2, 25.3, 25.4; 206/832, 206/80; 156/345.51
See application file for complete search history.

(56) References Cited

U.S. PATENT DOCUMENTS

| | | | | |
|---|---|---|---|---|
| 3,473,910 | A * | 10/1969 | Wilde et al. | 65/182.2 |
| 5,411,617 | A * | 5/1995 | La Fiandra | 156/154 |
| 6,505,483 | B1 * | 1/2003 | Hoetzl et al. | 65/25.2 |
| 2003/0014997 | A1 * | 1/2003 | Dunifon | 65/25.1 |

FOREIGN PATENT DOCUMENTS

| | | | |
|---|---|---|---|
| JP | 090278179 A | * | 10/1997 |
| JP | 2001007187 A | * | 1/2001 |
| KR | 20-1992-0018019 | | 10/1992 |
| KR | 10-2000-0025662 | | 5/2000 |
| KR | 10-2000-0049841 | | 8/2000 |
| KR | 10-1999-0033321 | | 5/2009 |

OTHER PUBLICATIONS

Programmable logic computer as recited in Wikipedia an online encyclopedia found at http://en.wikipedia.org/wiki/Programmable_logic_controller. Date of publication unknown.*
Office Action issued in corresponding Korean Patent Application No. 10-2004-0048802, mailed Nov. 16, 2010.

* cited by examiner

*Primary Examiner* — Sylvia R. MacArthur
(74) *Attorney, Agent, or Firm* — Brinks Hofer Gilson & Lione

(57) ABSTRACT

The present invention provides a glass support system, including methods and equipment for supporting a glass substrate on a column of air. The disclosed glass alignment equipment may be used to prevent or reduce defects or contamination on the surface of a glass substrate which may arise when the glass is aligned prior to etching. In particular, a support pin of the present invention may be used with an air circulation system to support or align glass over a column of air so as to reduce or prevent defects or contamination on the glass in dry etching processes used in the manufacturing of LCDs and other devices.

6 Claims, 3 Drawing Sheets

(a)  (b)  (c)

(a)  (b)  (c)

GLASS SUPPORT SYSTEM, METHOD OF SUPPORTING GLASS, AND ETCHING EQUIPMENT USING THE SAME

This application claims the benefit of priority under 35 U.S.C. §119 to Korean Patent Application No. 48802/2004, filed Jun. 28, 2004.

BACKGROUND OF THE INVENTION

1. Field of the Invention

The present invention relates to methods and equipment used in etching processes, more particularly, a glass support system, a method of supporting glass, an etching system, and a support pin. The disclosed methods and equipment may be used to prevent scratches and reduce contamination on surface of glass substrates used in dry-etching processes.

2. Description of the Related Art

Typically, dry-etching equipment includes an upper electrode and a lower electrode for generating plasma; an upper ceramic and a lower ceramic for supporting the upper and lower electrodes and preventing mutual contact of them; a gas diffusion pin for diffusing an intake gas; and lift pins for seating a target glass to be etched on a loading position.

When loading a glass target in a dry-etching process, a vacuum robot is used for carrying and moving the target for to the lower electrode for etching. After the lift pin is raised, the vacuum robot disposes the carried target on the lift pin and returns to a home position. When the lift pin is lowered, the target is disposed on the lower electrode, and an etching process is performed.

FIG. 1 is a plan view of a lower electrode plate within an etching chamber according to a related art. Briefly, a susceptor 100 for performing respective processes is disposed within a dry-etching chamber or a wet-etching chamber. The susceptor 100 has a lower electrode plate 101 disposed thereon and lift pins 103 are disposed with a predetermined interval along an edge of the lower electrode plate 101.

The lift pins 103 receive a glass target carried from the outside of the chamber by a robot arm and dispose the received glass on the lower electrode plate 101 inside the chamber. After the glass is transferred to the lower electrode plate 101, the lift pins 103 deliver the glass to the robot arm in order to transfer the glass to the outside of the chamber.

When the glass is transferred to the lower electrode plate 101 by the lift pins 103, support pins 105 are arranged at predetermined intervals around the inside of the lower electrode plate 101 and rise to support the glass.

FIG. 2 illustrate a process for seating a glass substrate according to a related art, wherein the glass 100 is moved to an inside portion of an etching chamber over the lower electrode plate 101. The glass 100 is supported by support pins 105 and can be raised or lowered a predetermined distance above the surface of the susceptor 100 by lift pins 103.

Each support pin 105 includes a metal sus and a plastic peek. The glass 110 delivered by the lift pins 103 is supported by the support pins 105, whose peeks contact the glass 100.

Support pins are used to align glass (FIG. 3). When a glass substrate is transferred in from the outside of the chamber, it is seated onto support pins by the lift pins. The glass substrate is delivered to the support pins when the lift pins descend, thereby disposing the glass thereon. The support pins align the glass to allow a predetermined process to be performed on the glass inside the chamber.

Support pins have a predetermined space in which they can move left or right on the lower electrode plate. Accordingly, once the glass is disposed on and supported by the support pins, the support pins can move a predetermined distance to facilitate alignment of the glass.

FIG. 4 is a view of a support pin according to a related art. Support pins are used to complete the alignment process. The support pin 105 includes a sus 105b and a peek 105a. Glass carried into the chamber directly contacts the peek 105a of the support pin 105. With the glass disposed on the peek 105a of the support pin 105, the alignment process can be performed. When an alignment appropriate for a particular etching process is made, the support pins descend to dispose the glass on the lower electrode plate of the susceptor so that a particular etching process may be performed.

However, when glass is aligned using the support pins 105 with the above structure, the peek 105a generates friction with the glass, especially when a large-sized glass with significant weight is applied to the support pins 105. Accordingly, this can result in a scratch defect on the glass surface. The friction and weight load may also contribute to deposition of foreign substances or contaminants from the pins onto the glass.

SUMMARY OF THE INVENTION

Accordingly, the present invention provides a glass support system, including methods and equipment for supporting a glass substrate on a column of air which may obviate one or more limitations or disadvantages associated with related art processes. The glass alignment equipment described herein may be used to prevent or reduce defects or contamination on the surface of a glass substrate which may arise when the glass is aligned prior to etching. In particular, a support pin of the present invention may be used in a process for supporting and align glass over a column of air to reduce or prevent defects or contamination on the glass in dry etching processes used in the manufacturing of LCDs and other devices.

Additional advantages and features of the invention are set forth in the description and claims which follow and will be apparent to those having ordinary skill in the art upon examining the information contained therein. The advantages of the present invention may be realized or achieved with the embodiments set forth in the specification, claims, and appended drawings.

In one aspect, the present invention provides a glass support system including: a plurality of support pins for supporting a glass substrate; an air tank supplying air to a plurality of support pins; and an air hose connecting the air tank to the plurality of support pins, wherein the air hose moves air from the air tank to a plurality of support pins.

In another aspect, the present invention provides a method of supporting a glass substrate in an etching chamber which includes: providing a glass substrate, support pins, a lower electrode plate, and an etching chamber; circulating air to a plurality of support pins; and delivering the glass substrate to the support pins, wherein the circulated air provides a column of air supporting the glass substrate so that the glass substrate does not contact the support pins.

In a further aspect, the present invention provides an etching system that includes: an upper electrode; a lower electrode; lift pins for loading and unloading a glass substrate on and from the lower electrode; support pins for receiving the glass substrate from the lift pins and for seating the received glass on the lower electrode; an air tank supplying air to the support pins; an air hose moving air from the air tank to the support pin; and a controller for controlling air pressure to the support pins.

In a further aspect, the present invention provides support pin suitable for use in a dry-etching process, wherein the support pin includes a through hole and wherein the support pin is formulated to permit sufficient air circulation through the through hole to support a glass substrate under a column of air without contacting the glass substrate when a plurality of the support pins are used in a dry-etching process.

It is to be understood that both the foregoing general description and the following detailed description of the present

BRIEF DESCRIPTION OF THE DRAWINGS

The accompanying drawings illustrate aspects and principles of the related art and of the present invention.

DETAILED DESCRIPTION OF THE INVENTION

Figure 1:
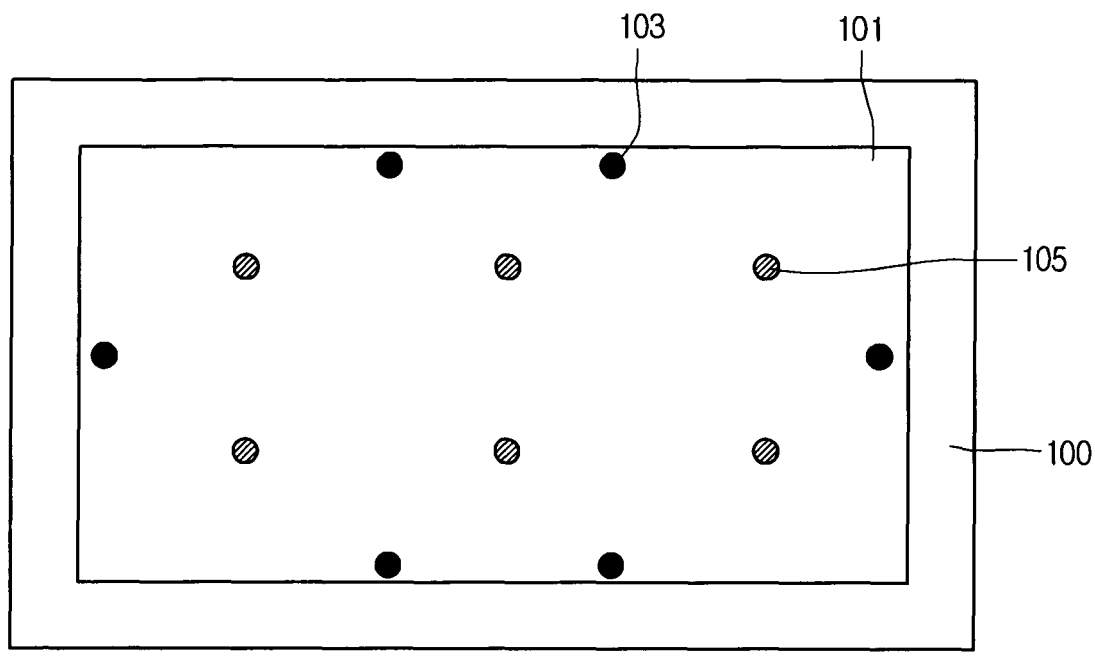
FIG. 1 is a plan view of a lower electrode plate in an etching chamber according to a related art.
Figure 2:
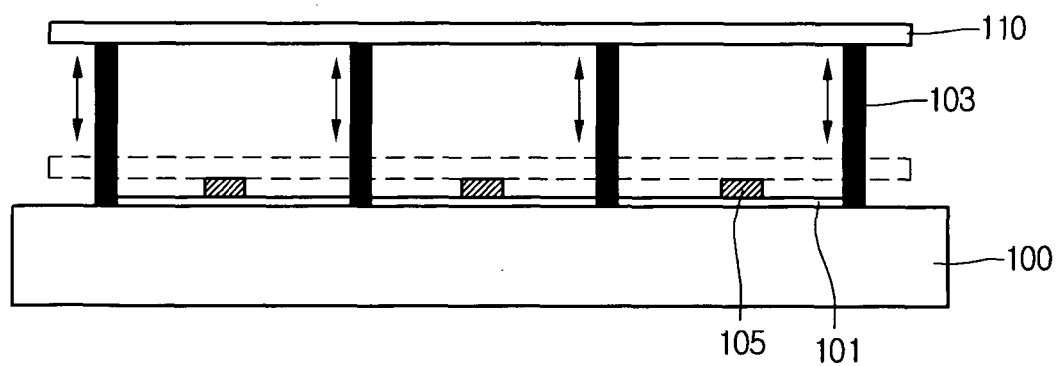
FIG. 2 illustrates a process for seating and moving a glass substrate inside an etching chamber onto a lower electrode plate according to a related art.
Figure 3:
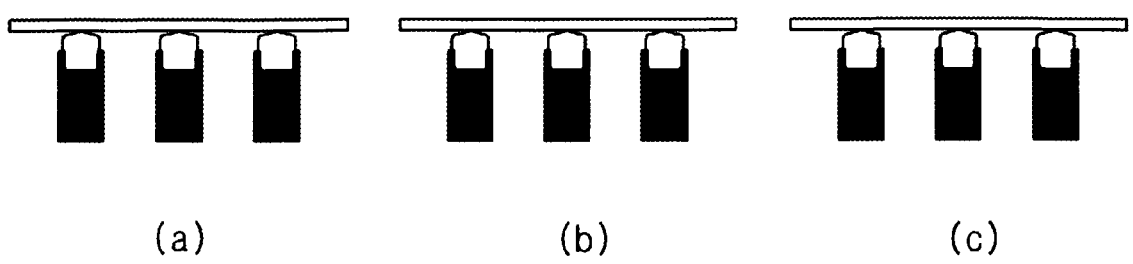
FIG. 3 illustrates a process of using a support pin to align a glass substrate according to a related art.
Figure 4:
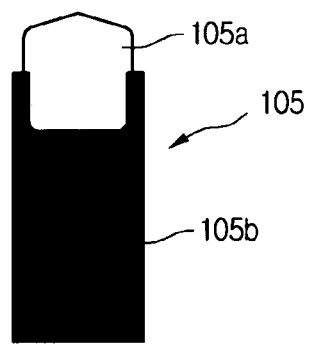
FIG. 4 illustrates a support pin according to a related art.
Figure 5:
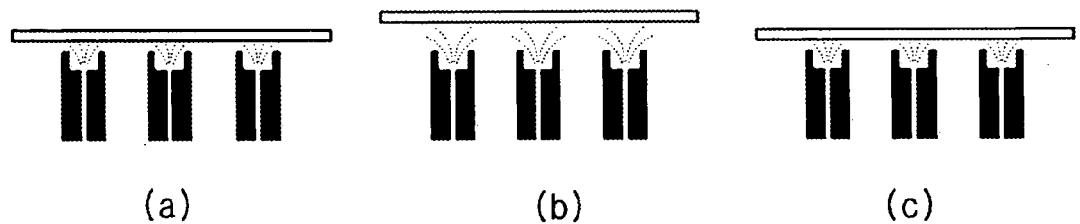
FIG. 5 illustrates a process of using a support pin to align a glass substrate according to an aspect of the present invention.

Reference to various embodiments of the present invention will now be made, examples of which are described in the specification and claims and illustrated in FIGS. 5-6.

The present invention allows a glass substrate to be supported by support pins ascending above the lower electrode, through which air of a predetermined pressure or air flow is sprayed or applied so that the glass floats over the support pins used to align the glass. In other words, the glass is supported by air, rather than direct contact with the support pins (FIG. 5).

The glass substrate is delivered from the lift pins to the support pins. Each support pin has at least one hole for spraying air. The through hole may be connected by an air hose to an air tank. When the lift pins descend, the glass is transferred and floated onto the glass at a predetermined distance above the support pins (FIG. 5A).

Following the transfer to the support pins, the glass is appropriately aligned for a subsequent treatment process. Accordingly, the glass is elevated by increasing the air pressure through the support pins and the pins are moved according to an appropriate alignment (FIG. 5B).

After the glass is appropriately aligned on the support pins, the air pressure is reduced, and the glass is lowered so as to float a predetermined distance above the support pins (FIG. 5C).

By floating the glass above the support pins during the alignment process, it is possible to prevent scratch defects on glass surface, since direct contact between support pins and the glass surface is avoided. Moreover, because the pins do not contact the glass, there is a reduced chance of contaminated substances transferring from the support pins to the glass.

Figure 6:
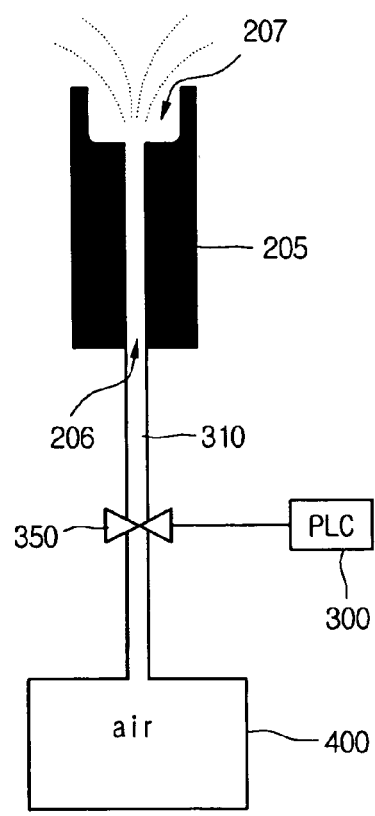
FIG. 6 is a view of a glass support system according to an aspect of the present invention.

A representative support pin 205 may include a metal sus and a through hole 206 to facilitate circulation of air though the support pin 205 (FIG. 6). Since the present invention can, in effect, reduce the load applied to or making contact with the support pins, the support pins need not be limited to metal having high strength. Therefore, support pins for use in the present invention may be made from a variety of materials, including but not limited to plastic and/or other natural or synthetic materials.

A suitable air control system may be used to regulate an amount, pressure, or flow of air sufficient to support and/or align the glass, and to prevent or at least limit direct contact between the glass and the support pins. An air hose 310 may be used to circulate air from a suitable air source, such as an air tank 400 to the through hole 206 and out from the support pin 205. The air may be circulated be any suitable means, including spraying, blowing etc.

The air control system may include at least one valve 350 or other conventional control component for regulating any aspect of air intake, including amount, flow or pressure of air through a support pin. The valve 350 may be disposed on the air hose 310 other suitable air control component. The valve 350 may be subject to manual or automatic control. Accordingly, the valve may be regulated by control signals from a controller 300, such as a computer, or other suitable automated systems known to those skilled of ordinary skill in the art.

A controller 300 may be used to control air through the valve 350 or other suitable air control device using program logic signals. Program logic signals may include control signals programmed according to operations in which the glass is seated on and aligned above the support pins 205. The programmed signals may be sequentially applied to the valve 350 so as to regulate the amount or flow of air though the support pins.

The glass may be aligned using different air amounts or air flows circulated onto the glass seated on the support pins 205 before, during or after the alignment process.

The support pin 205 may further include at least one crevice, depression or groove 207 at the end of the support pin and/or at the edge of a support pin side to widen the spray angle of the air though the support pin or otherwise aid in circulating air therethrough.

For example, the groove 207 may have a structure such that the through hole 206 of the support pin 205 is exposed to the outside. With such a structure, air flowing along the through hole 206 can be sprayed in a fan shape at the edge where the groove 207 is formed.

Accordingly, the glass may be aligned such that the glass is maintained or floated at a predetermined distance from the support pins 205.

The present invention for preventing or reducing scratches, damage and/or contamination to glass by using air pressure to float or support glass above a set of support pins may be applied or adapted to any process involving alignment of glass or other substrates. The modified glass support system of the present invention may therefore be used with a variety of equipment, including those used in dry-etching or wet-etching processes or in any process involving support and/or alignment of substrates susceptible to defects cause by friction or direct contact with other materials. Moreover, although the present invention describes materials and methods for floating glass on air, the disclosed methods can be adapted to floating the glass using other appropriate gases as well.

It will be apparent to those skilled in the art that various modifications and variations can be made in the present invention. Thus, the present invention is intended to cover the modifications and variations of this invention provided they come within the scope of the specification, appended claims and their equivalents.

What is claimed is:

1. A glass support system comprising:
a plurality of support pins for supporting a glass substrate, wherein each support pin comprises a through hole and a groove, the through hole penetrating through a center of each support pin and the groove formed to extend from the through hole at an edge of each support pin adjacent to the glass substrate, wherein the groove has a greater width than a diameter of the through hole such that a spray angle of air is widened, thereby spraying the air in a fan shape at the edge where the groove is formed;
an air tank supplying air to the support pins, wherein the supplying air is sprayed by the groove;
an air hose connecting the air tank to the plurality of support pins, wherein the air hose moves air from the air tank to a plurality of support pins;
a valve controlling air movement through a plurality of support pins; and
a controller for controlling the air movement through the valve by using program logic signals,
wherein the controller is configured to control the amount of air circulated through the support pins before, during, and after an alignment process such that the air is circulated to the plurality of pins before the glass substrate is delivered to the plurality pins, the air movement is increased during the alignment process of the glass substrate and the air movement is reduced after the alignment process, and such that the glass substrate does not contact the plurality of pins before, during, and after the alignment process,
wherein the groove is disposed on the through hole, and the through hole is directly connected with a center part of a bottom of the groove, and
wherein the sprayed air blows directly to the glass substrate through the groove.

2. The glass support system of claim 1, wherein the controller controls air movement according to a programmed command.

3. The glass support system of claim 1, wherein a plurality of support pins are capable of supporting the glass substrate under a column of air without contacting the glass substrate.

4. The glass support system of claim 1, wherein the groove is formulated to circulate an amount of air sufficient to support the glass substrate under a column of air without contacting the glass substrate.

5. The glass support system of claim 1, wherein the groove is cylindrical.

6. The glass support system of claim 1, wherein the air flowing through the support pin is operable to lift the glass.

* * * * *